(12) United States Patent
Wang et al.

(10) Patent No.: US 10,645,417 B2
(45) Date of Patent: May 5, 2020

(54) VIDEO CODING USING PARAMETERIZED MOTION MODEL

(71) Applicant: GOOGLE LLC, Mountain View, CA (US)

(72) Inventors: Yunqing Wang, Palo Alto, CA (US); Yiming Qian, Edmonton (CA)

(73) Assignee: GOOGLE LLC, Mountain View, CA (US)

( * ) Notice: Subject to any disclaimer, the term of this patent is extended or adjusted under 35 U.S.C. 154(b) by 20 days.

(21) Appl. No.: 15/727,894

(22) Filed: Oct. 9, 2017

(65) Prior Publication Data

US 2019/0110075 A1   Apr. 11, 2019

(51) Int. Cl.
| | |
|---|---|
| *H04N 19/597* | (2014.01) |
| *H04N 19/182* | (2014.01) |
| *H04N 19/176* | (2014.01) |
| *H04N 19/56* | (2014.01) |
| *H04N 19/513* | (2014.01) |
| *H04N 19/70* | (2014.01) |
| *H04N 19/139* | (2014.01) |

(Continued)

(52) U.S. Cl.
CPC ......... *H04N 19/597* (2014.11); *H04N 19/176* (2014.11); *H04N 19/182* (2014.11); *H04N 19/521* (2014.11); *H04N 19/56* (2014.11); *H04N 19/105* (2014.11); *H04N 19/139* (2014.11); *H04N 19/187* (2014.11); *H04N 19/70* (2014.11)

(58) Field of Classification Search
CPC .. H04N 19/597; H04N 19/176; H04N 19/182; H04N 19/70

USPC ..................................................... 375/240.16
See application file for complete search history.

(56) References Cited

U.S. PATENT DOCUMENTS

| | | |
|---|---|---|
| 8,867,826 B2 | 10/2014 | Rzeszutek et al. |
| 9,342,916 B2 | 5/2016 | Guseva |

(Continued)

OTHER PUBLICATIONS

Vetro et al. "HEVC-Compatible Extensions for Advanced Coding of 3D and Multiview Video" (Year: 2015).*

(Continued)

*Primary Examiner* — James T Boylan
(74) *Attorney, Agent, or Firm* — Young Basile Hanlon & MacFarlane, P.C.

(57) ABSTRACT

Video blocks of stereo or non-stereo video sequences are coded using a parameterized motion model. For example, encoding a current block of a stereo video sequence can include determining a block-level disparity between first and second frames and identifying plane normal candidates within the current block of the first frame based on the block-level disparity. One of the plane normal candidates is selected based on rate-distortion values, and warping parameters are determined for predicting motion within the current block using the selected plane normal candidate. The current block is then encoded using a reference block generated by applying the warping parameters. Decoding that encoded block can include receiving a bitstream representing an encoded stereo video sequence, determining warping parameters for predicting motion within the encoded block based on syntax elements encoded to the bitstream, and decoding encoded block using a reference block generated by applying the warping parameters.

20 Claims, 8 Drawing Sheets

(51) Int. Cl.
*H04N 19/105* (2014.01)
*H04N 19/187* (2014.01)

(56) References Cited

U.S. PATENT DOCUMENTS

| | | | |
|---|---|---|---|
| 2002/0106120 A1* | 8/2002 | Brandenburg | G06K 9/209 382/154 |
| 2011/0109720 A1 | 5/2011 | Smolic et al. | |
| 2013/0187910 A1 | 7/2013 | Raymond et al. | |
| 2013/0342644 A1* | 12/2013 | Rusanovskyy | H04N 19/597 348/43 |

OTHER PUBLICATIONS

Lu et al. "An Epipolar Geometry-Based Fast Disparity Estimation Algorithm for Multiview Image and Video Coding" (Year: 2007).*
Han et al. "A Novel Stereo Image Coding Algorithm Based on Delaunay Triangulation Mesh" (Year: 2004).*
Barath et al. "A Novel Technique for Point-wise Surface Normal Estimation" (Year:2016).*
International Search Report and Written Opinion in PCT2018/040797 dated Sep. 18, 2018, 13 pgs.
Anthony Vetro et al., "HEVC-Compatible Extensions for Advanced Coding of 3D and Multiview Video", Proceedings of 2015 Data Compression Conference, IEEE Computer Society, Piscataway, NJ, Apr. 7, 2015, pp. 13-22.
Jungong Han and Zhaoyang Lu, "A Novel Stereo Image Coding Algorithm Based on Delaunay Triangulation Mesh", Visual Communications and Image Processing 2004, Proceedings of SPIE-IS&T Electronic Imaging, SPIE vol. 5308, pp. 1169-1180.
I. Feldmann et al., "Multi-view depth estimation based on visual-hull enhanced Hybrid Recursive Matching for 3D video conference systems", 2009 16th IEEE International Conference on Image Processing (ICIP), IEEE, Piscataway, NJ, Nov. 7, 2009, pp. 745-748.
Peter Kauff et al., "Fast hybrid block- and pixel-recursive disparity analysis for real-time applications in immersive teleconference scenarios", Proceedings of 9th International Conference in Central Europe on Computer Graphics, Visualization and Computer Vision 2001, Univ. West Bohemia, Czech Republic, vol. 1, Jan. 1, 2001, pp. 198-205.
Andrea Eichenseer et al., "Disparity Estimation for Fisheye Images with an Application to Intermediate View Synthesis", 2017 IEEE 19th International Workshop on Multimedia Signal Processing (MMSP), IEEE, Oct. 16, 2017, 6 pgs.
Bankoski, et al., "Technical Overview of VP8, An Open Source Video Codec for the Web", Jul. 11, 2011, 6 pp.
Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.

* cited by examiner

VIDEO CODING USING PARAMETERIZED MOTION MODEL

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

A method for encoding blocks of frames of a stereo video sequence according to an implementation of this disclosure comprises determining a block-level disparity between a first frame of the stereo video sequence and a second frame of the stereo video sequence. The method further comprises identifying plane normal candidates within a current block of the first frame based on the block-level disparity. The method further comprises selecting one of the plane normal candidates based on rate-distortion values associated with ones of the plane normal candidates. The method further comprises determining warping parameters for predicting motion within the current block using the selected plane normal candidate. The method further comprises encoding the current block according to the warping parameters.

An apparatus for encoding blocks of frames of a stereo video sequence according to an implementation of this disclosure comprises a processor configured to execute instructions stored in a non-transitory storage medium. The instructions include instructions to determine a block-level disparity between a first frame of the stereo video sequence and a second frame of the stereo video sequence. The instructions further include instructions to identify plane normal candidates within a current block of the first frame based on the block-level disparity. The instructions further include instructions to select one of the plane normal candidates based on rate-distortion values associated with ones of the plane normal candidates. The instructions further include instructions to determine warping parameters for predicting motion within the current block using the selected plane normal candidate. The instructions further include instructions to encode the current block according to the warping parameters.

A method for decoding encoded blocks of encoded frames of an encoded stereo video sequence according to an implementation of this disclosure comprises receiving a bitstream representative of the encoded stereo video sequence. The method further comprises determining, based on one or more syntax elements encoded to the bitstream, warping parameters for predicting motion within an encoded block of a first encoded frame of the encoded stereo video sequence using a selected plane normal candidate. The selected plane normal candidate represents a current pixel of the encoded block and selected based on a block-level disparity between the first encoded frame and a second encoded frame of the encoded video sequence. The method further comprises decoding the encoded block according to the warping parameters.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings described below, wherein like reference numerals refer to like parts throughout the several views.

DETAILED DESCRIPTION

Video compression schemes may include breaking respective images, or frames, into smaller portions, such as blocks, and generating an output bitstream using techniques to limit the information included for respective blocks in the output. An encoded bitstream can be decoded to re-create the source images from the limited information. Typical video compression and decompression techniques use regular motion compensation, which use inter-frame redundancies to predict motion based on temporal similarities between video frames or intra-frame redundancies to predict motion based on spatial similarities within individual video frames.

In some cases, redundancies in addition to inter-frame or intra-frame redundancies may be leveraged for performing motion compensation. For example, in the context of stereo video (e.g., as used in virtual reality video applications), an inter-view redundancy may be used to determine similarities between left and right views. A stereo video includes left and right views, which reflect images viewed respectively by the left and right eyes of a stereo video user. Each of the left and right views may be represented by a frame of a stereo video sequence. As such, at any given time during the presentation of a stereo video, two frames are displayed to a user. Those frames show different perspectives of the same portion of the video, and thus may include many similarities. Because those frames likely share similarities, one of those frames may be used as a reference for predicting motion within the other.

However, regular motion compensation for stereo and non-stereo video sequences assumes purely translational motion between or within blocks, to predict the motion within blocks of frames to be encoded or decoded. However, not all motion within a block can be described using translational motion models, which are only capable of rectangular transformations. For example, some motion may include scaling, shearing, or rotational motion, either alone or with translational motion. In the context of stereo video sequences, for example, a translational motion model may not accurately reflect the similarities between the video frames representing left and right views.

Certain techniques for performing motion compensation including determining non-purely translational motion may include using motion vectors from video blocks adjacent to a current block to be encoded or decoded and using a function, for example, a least squares fitting, to determine warping parameters to predict the motion. Those warping parameters may, for example, be parameters of an affine motion model. However, such techniques do not always provide accurate predictions for stereo video sequences, for example, because those warping parameters may not accurately reflect motion in stereo video sequences.

Implementations of this disclosure include encoding and decoding video blocks of stereo or non-stereo video sequences using a parameterized motion model that reflects multiple motion types within video frames. The parameterized motion model includes warping parameters indicating how pixels of a video block are warped (e.g., scaled, rotated, or otherwise moved) to generate a prediction block usable for encoding or decoding that video block. The implementations of this disclosure can be used to predict motion based on inter-frame redundancies or inter-view redundancies.

In one example, encoding a current block of a stereo video sequence according to an implementation of this disclosure can include determining a block-level disparity between first and second frames of the stereo video sequence and identifying plane normal candidates within the current block of the second frame based on the block-level disparity. One of the plane normal candidates is selected based on rate-distortion values, and warping parameters are determined for predicting motion within the current block using the selected plane normal candidate. The current block is then encoded according to the warping parameters. Decoding that encoded block according to an implementation of this disclosure can include receiving a bitstream representative of an encoded stereo video sequence and determining warping parameters for predicting motion within the encoded block based on one or more syntax elements encoded to the bitstream. The encoded block is then decoded according to the warping parameters.

Figure 1:
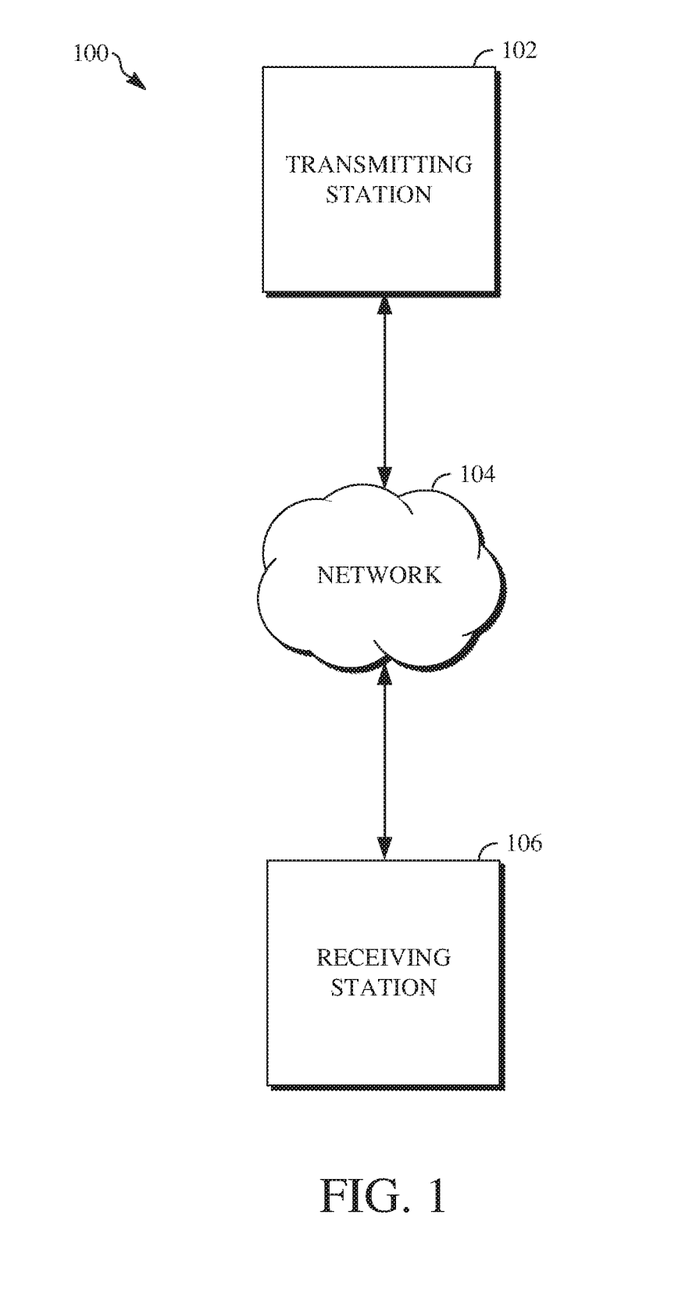
FIG. 1 is a schematic of a video encoding and decoding system.

Further details of techniques for video coding using a parameterized motion model are described herein with initial reference to a system in which they can be implemented. FIG. 1 is a schematic of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
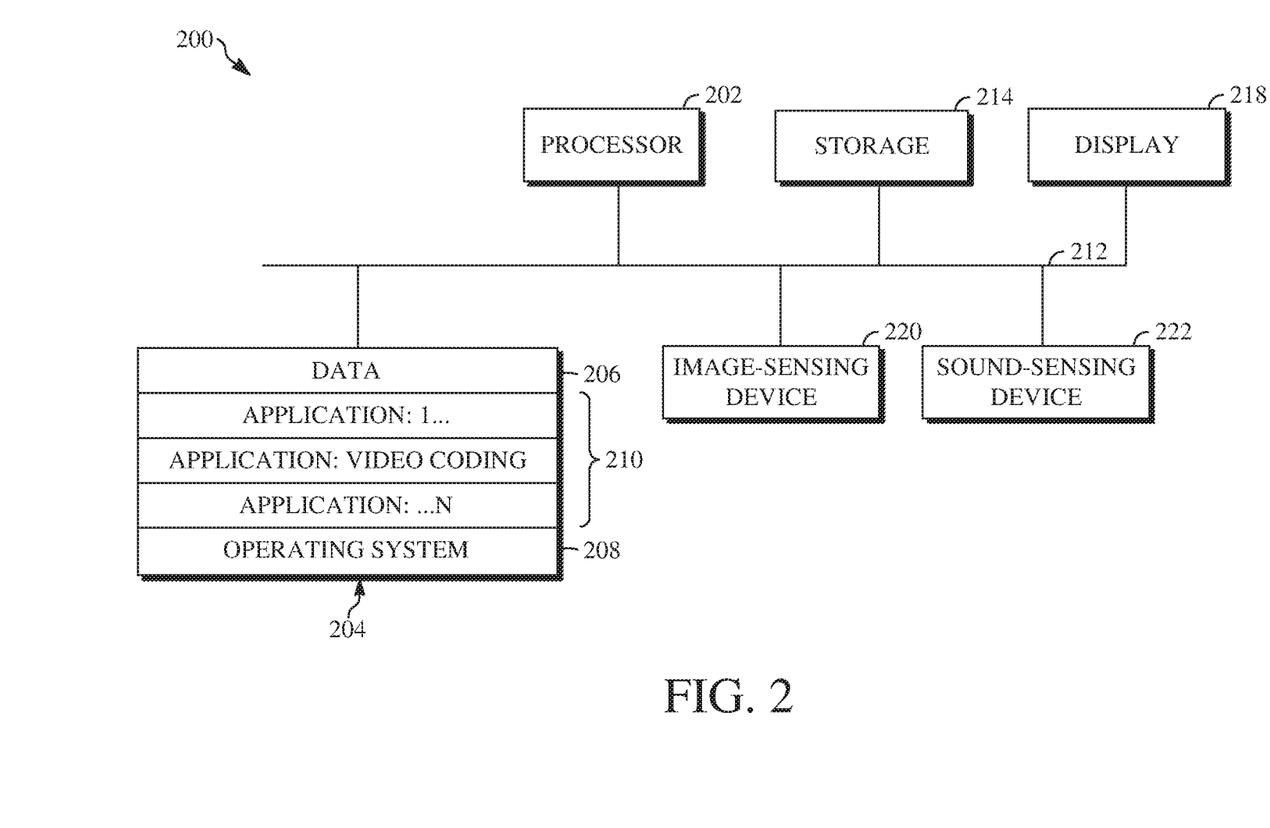
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used (e.g., a Hypertext Transfer Protocol-based (HTTP-based) video streaming protocol).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include a video coding application that performs the techniques described herein. The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
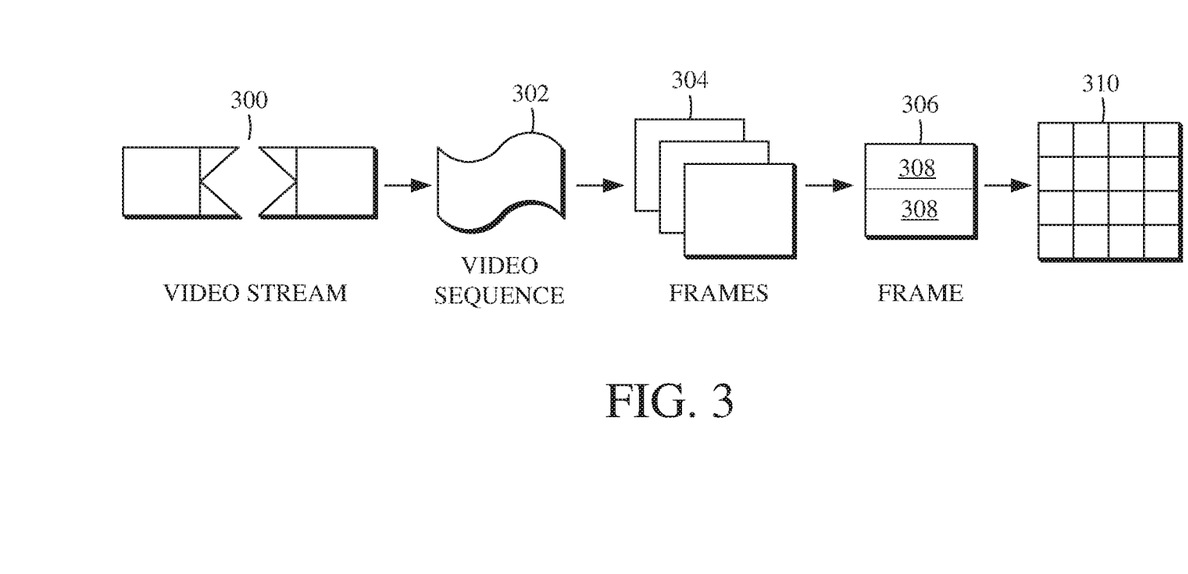
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
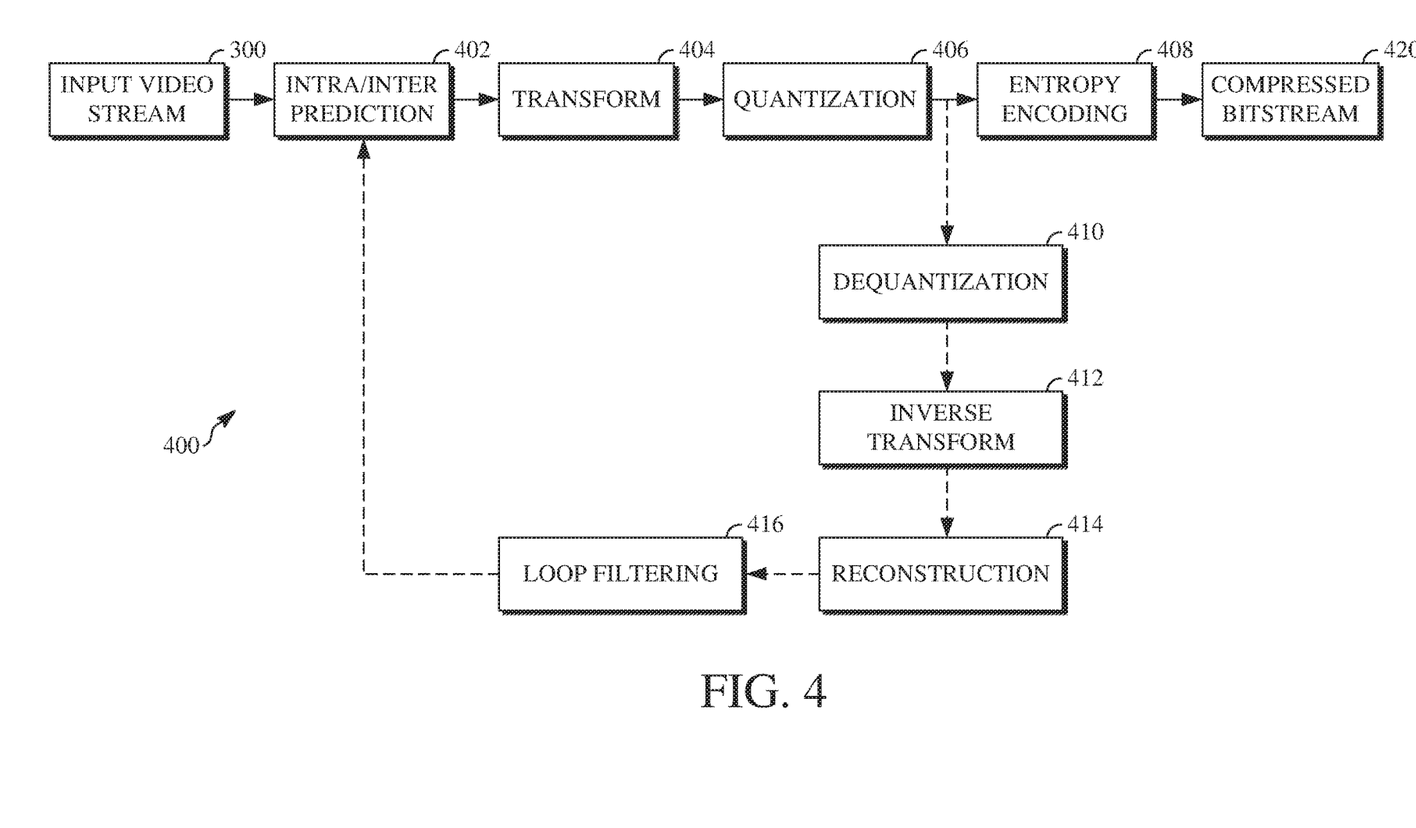
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. In some implementations, a non-transform based encoder can quantize the residual signal directly without the transform stage 404 for certain blocks or frames. In some implementations, an encoder can have the quantization stage 406 and the dequantization stage 410 combined in a common stage.

Figure 5:
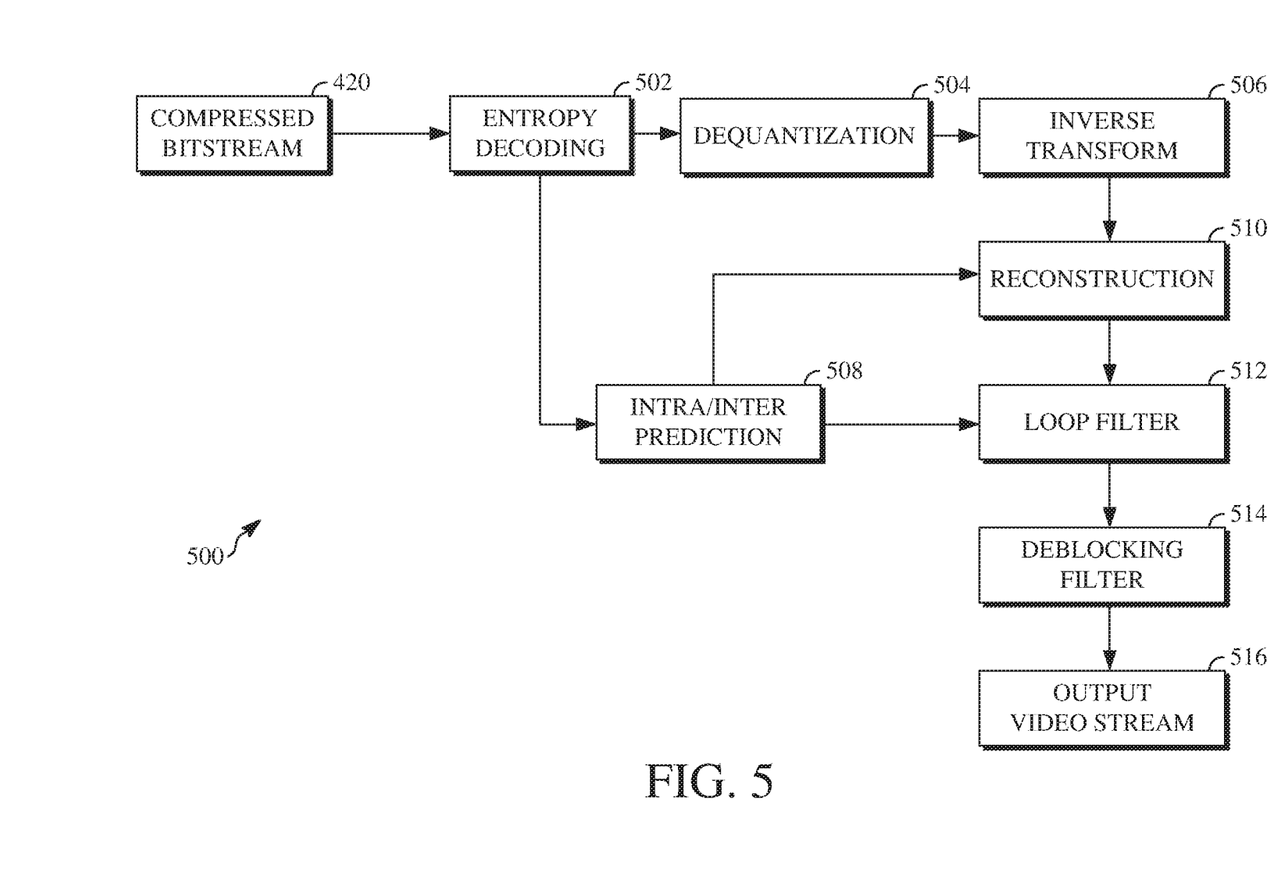
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. In some implementations, the decoder 500 can produce the output video stream 516 without the deblocking filtering stage 514.

Figure 6:
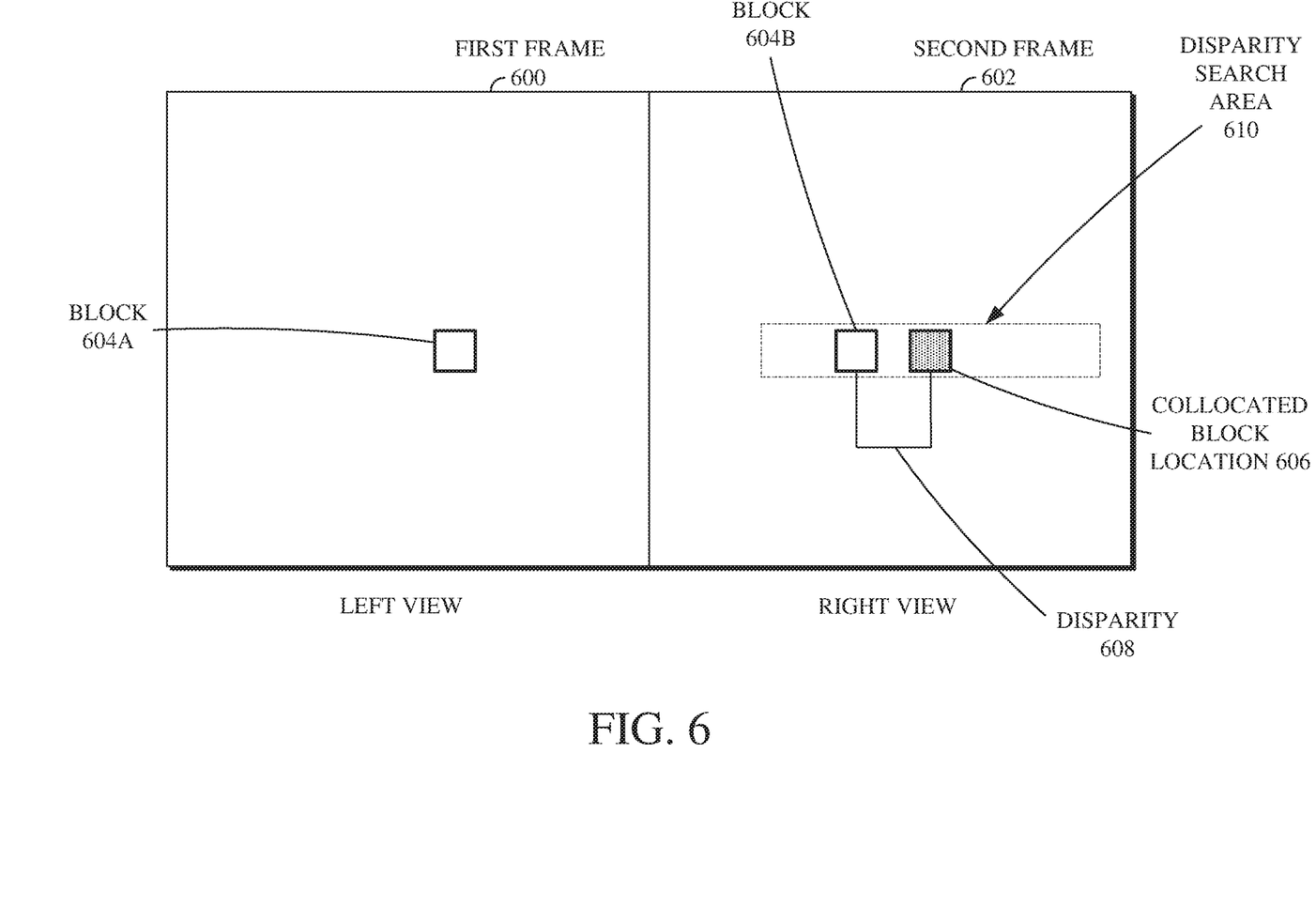
FIG. 6 is an illustration of corresponding left and right views shown within associated frames of a stereo video sequence.

FIG. 6 is an illustration of corresponding left and right views shown within associated frames of a stereo video sequence. As shown, a first frame 600 represents the left view and a second frame 602 represents the right view; however, based on the arrangement of frames within the stereo video sequence, the first frame 600 may in some cases represent the right view and the second frame 602 may in such cases represent the left view. The first frame 600 and the second frame 602 are simultaneously displayed in an output video stream, for example, to a user wearing a virtual reality headset or otherwise using a device configured for stereo video viewing. The first frame 600 and the second frame 602 may include the same video objects. For example, each of the first frame 600 and the second frame 602 may include an object shown in the first frame 600 at the block 604A and in the second frame at the block 604B. That is, the pixels of each of the block 604A and the block 604B may have identical luminance, chrominance, or other values.

However, the position of the block 604A in the first frame 600 is different from the position of the block 604B in the second frame 602. This may, for example, be because of perspectives associated with the left and right view for looking at the object shown at the block 604A and the block 604B. A corresponding block 606 reflects a collocated position of the block 604A within the second frame 602.

The positional difference between the block 604B and the corresponding block 606 within the second frame 602 is referred to as a disparity 608. The disparity 608 reflects a horizontal position difference between the block 604B and the corresponding block 606 because the first frame 600 and the second frame 602 are two views within the stereo video sequence (e.g., as left and right views) and follow epipolar geometry. The first frame 600 and the second frame 602 may, at least in some cases, be considered as different views of a single stereo video frame.

The disparity 608 can be determined by performing a disparity search against blocks of the first frame 600 and the second frame 602. For example, performing the disparity search can include identifying the collocated block 606 based on the position of the block 604A within the first frame 600 and then performing a diamond search starting at the position of the collocated block 606 within the second frame 602. The diamond search may, for example, be a one-dimensional diamond search. This is because the disparity 608 to be determined reflects a one-dimensional translation. A disparity search area 610 reflects an area of the second frame 602 within which the disparity search is performed.

The block 604A can then be encoded using the block 604B as a reference block. The disparity 608 is used to adjust position information used for warping the reference block to the block 604A.

Figure 7:
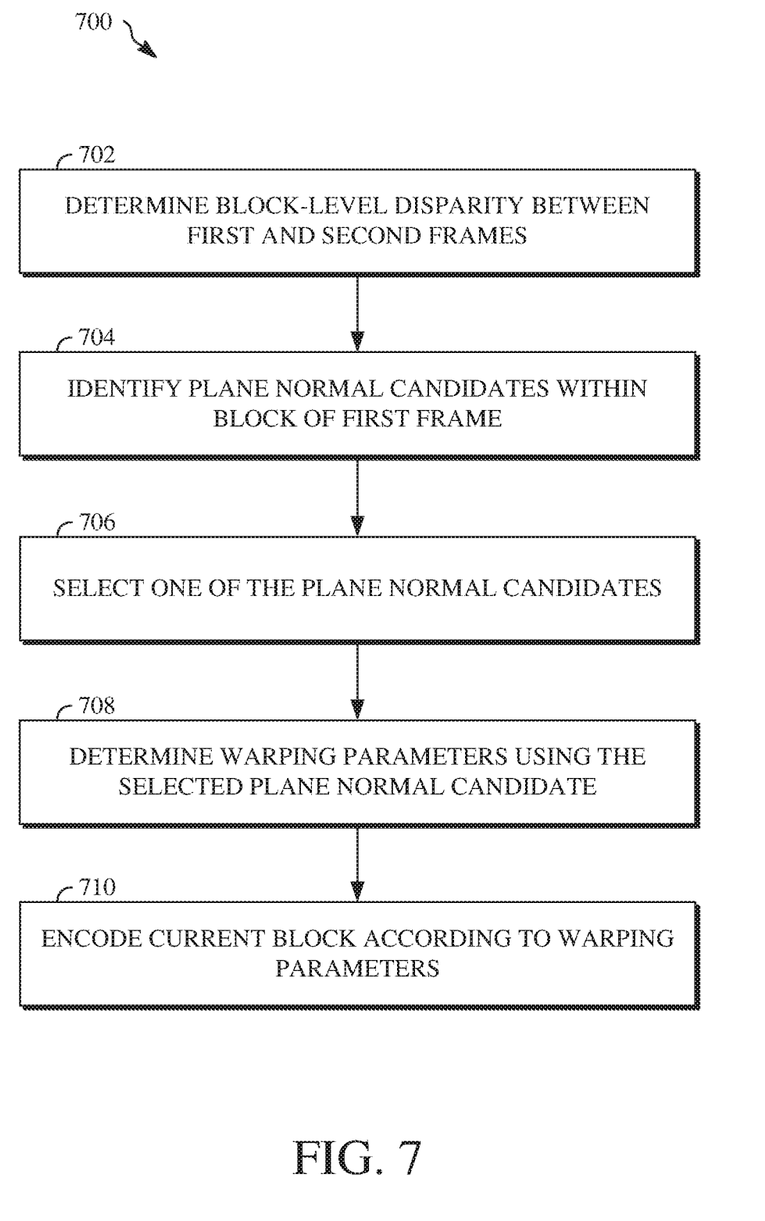
FIG. 7 is a flowchart diagram of an example of a technique for encoding a video block using a parameterized motion model.
Figure 8:
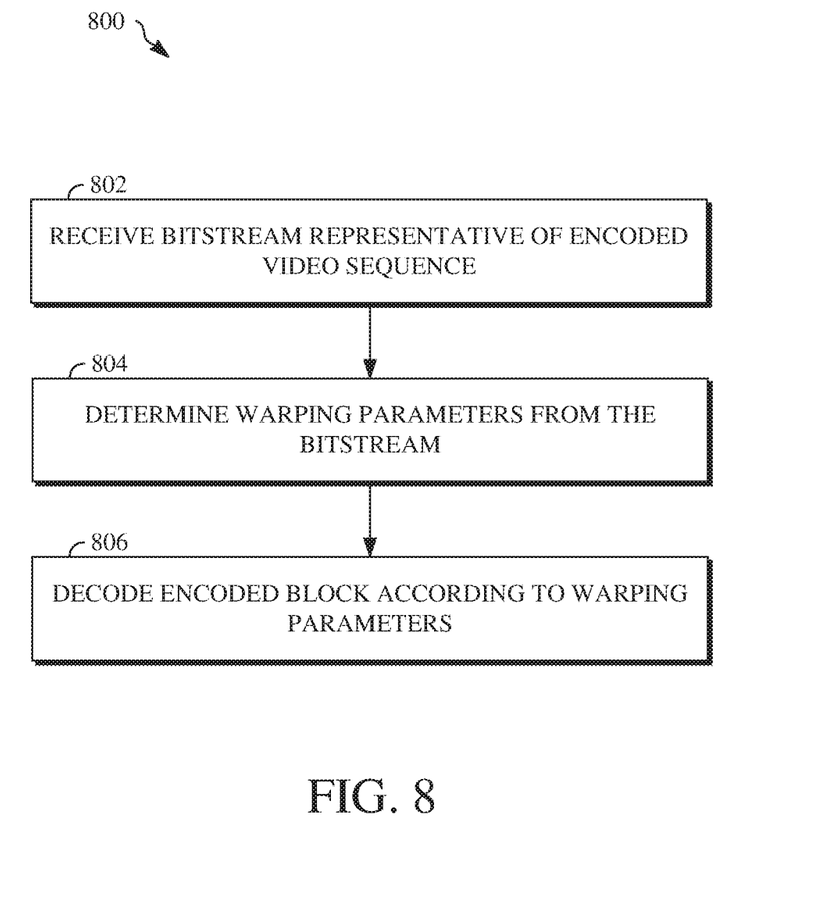
FIG. 8 is a flowchart diagram of an example of a technique for decoding an encoded block using a parameterized motion model.

Techniques for encoding or decoding video blocks are now described with respect to FIGS. 7 and 8. FIG. 7 is a flowchart diagram of an example of a technique 700 for encoding a video block using a parameterized motion model. FIG. 8 is a flowchart diagram of an example of a technique 800 for decoding an encoded block using a parameterized motion model. One or both of the technique 700 or the technique 800 can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the processor 202, may cause the computing device to perform the technique 700 and/or the technique 800. One or both of the technique 700 or the technique 800 can be implemented using specialized hardware or firmware. As explained above, some computing devices may have multiple memories or processors, and the operations described in one or both of the technique 700 or the technique 800 can be distributed using multiple processors, memories, or both.

For simplicity of explanation, the technique 700 and the technique 800 are each depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 7, a flowchart diagram of an example of a technique 700 for encoding a video block using a parameterized motion model is shown. The parameterized motion model is used to warp a reference block towards the video block. In the context of a stereo video sequence, for example, to better match a video block in one stereo frame, a corresponding reference block in another stereo frame is warped.

At 702, a block-level disparity is determined between a first frame of a stereo video sequence and a second frame of the stereo video sequence. In an example, the first and second frames may respectively represent left and right views of the stereo video sequence; however, in another example, the first and second frames may respectively represent the right and left views of the stereo video sequence. The block-level disparity is a disparity indicating a positional difference between one or more blocks of the first frame and one or more blocks of the second frame. For example, the block-level disparity can reflect a horizontal positional difference between the video block to be encoded within the first frame (e.g., the current block) and a reference video block within the second frame. Determining the block-level disparity can include performing a disparity search against blocks of the first frame and blocks of the second frame, for example, the current block and the reference video block. The disparity search may, for example, be a one-dimensional diamond search.

That is, the left and right views of a stereo video sequence follow epipolar geometry such that a pixel value located in one of those views will be located at along the same epipolar (e.g., horizontal) line as the same pixel value within the other of those views. As such, the disparity between the current block and the reference video block will ultimately reflect a one-dimensional translation. The block-level disparity can then be determined based on the results of the disparity search. For example, if the position of the current block within the first frame is (x, y), the position of the reference block within the second frame is (x+D, y), where D represents the disparity determined by performing the disparity search.

At 704, plane normal candidates are identified within the current block. The plane normal candidates are identified based on the block-level disparity. Identifying the plane normal candidates includes performing a normal search against pixels of the current block based on a location of a sample pixel of the current block and the block-level disparity. Locations of respective ones of the pixels within the current block are then identified based on results of the normal search. Pixel-level disparities are then determined based on the locations of the respective ones of the pixels within the current block. Those pixel-level disparities are used to identify the plane normal candidates.

For example, a three-dimensional linear plane can be used to model one-dimensional disparity motion associated with the block-level disparity. The pixel-level disparity for a given pixel can be defined as $d(x, y)=a*x+b*y+c$, where $d(x, y)$ represents the disparity function with respect to the location of the pixel within the current block; x and y represent the location of the pixel within the current block; a and b are warping parameters of the linear plane used to model the one-dimensional disparity motion associated with the block-level disparity and which are common for all pixels in the current block; and c is the block-level disparity, which is also common for all pixels in the current block. The values of x and y can initially be defined as the point of origin of the current block (e.g., the center of the current block) such that the values of x and y are each zero (e.g., such that the represented position is (0, 0)). The pixel-level disparity at the center of the current block is therefore represented by the block-level disparity thereof.

As such, a normal search is performed against pixels of the current block based on the initial position of (0, 0) and the block-level disparity. Performing the normal search includes determining values of a normal vector (nx, ny, nz), which is the normal vector of the three-dimensional linear plane used to model the one-dimensional disparity motion associated with the block-level disparity. For example, the equation described above for the pixel-level disparity for a given pixel can be rearranged as $nx*(x-x0)+ny*(y-y0)+nz*(z-z0)=0$, where x and y reflect the position of a given pixel and z reflects the pixel-level disparity for that pixel, (x0, y0, z0) reflects a sample point on a three-dimensional plane where $x0=y0=0$ and $z0=d(x0, y0)=d(0, 0)$ such that the value of z0 defined as the block-level disparity.

The locations of pixels within the current block are determined based on the results of the normal search. For example, the length of the normal vector (nx, ny, nz) should be 1 where nx and ny are both greater than −1 and nz is greater than 0 and less than or equal to 1. The particular values of nx and ny can be searched within a predefined discrete set of values. For example, the predefined discrete set of values can be [−0.7, −0.525, −0.35, −0.175, 0.0, 0.175, 0.35, 0.525]. Other values than as shown may also or instead be included in the predefined discrete set of values. The particular value of nz can be defined as $nz=sqrt(1-nx*nx-ny*ny)$.

By using various values of nx and ny, values of nz can be determined, such that those values of the normal vector (nx, ny, nz) can be used to determine normal values for locations of pixels within the current block. Those normal values are used as the plane normal candidates. Further, by plugging individual ones of those pixel locations into the rearranged equation described above, pixel-level disparities can be determined for respective ones of the plane normal candidates.

At 706, one of the plane normal candidates is selected based on rate-distortion values associated with ones of the plane normal candidates. Selecting the one of the plane normal candidates includes determining rate-distortion values resulting from predicting the motion within the current block for the ones of the plane normal candidates using respective ones of the pixel-level disparities. A rate-distortion value refers to a ratio that balances an amount of distortion (e.g., a loss in video quality) with rate (e.g., a number of bits) for coding a block or other video component. Subsequent to determining the rate-distortion values for the plane normal candidates, the plane normal candidate associated with the pixel-level disparities that resulted in a lowest one of the rate-distortion values is selected.

For example, the rate-distortion values may be defined as $RD=d+\lambda*(dr+nr)$, where RD is the rate-distortion value determined for a given plane normal candidate, d is the distortion measuring the prediction error that is the sum of the absolute pixel difference between the warped video block and the current block, $\lambda$ is a Lagrange multiplier, dr is the disparity rate that represents the rates required for storing disparities and is based on the block-level, and nr is the normal rate that represents the rates required form strong normals and is based on the values of nx and ny used to determine the given plane normal candidate. To reduce overhead, the indexes of the values of nx and ny are stored instead of the actual values of nx and ny.

At 708, warping parameters are determined for predicting motion within the current block using the selected plane normal candidate. The warping parameters are determined based on the normals (nx, ny, nz) and pixel-level disparity associated with the selected plane normal location candidate. The warping parameters may, for example, be warping parameters previously determined as part of the operations for identifying the plane normal candidates. For example, determining the warping parameters can include selecting the warping parameters from a list of warping parameters. Alternatively, the warping parameters may be determined based on results of the operations for identifying the plane normal candidates and results of the operations for selecting one of those plane normal candidates.

The warping parameters are used to describe motion of pixels of the current block. For example, the warping parameters may be used to indicate a translation, rotation, scale, change in aspect ratio, shearing, or like motion, or a combination thereof, of those pixels. However, in another example, the warping parameters may merely be used to merely indicate a translation of those pixels. The warping parameters may be parameters of an affine motion model.

At 710, the current block is encoded according to the warping parameters. Encoding the current block according to the warping parameters includes generating a prediction block by warping a current pixel within the current block according to motion of a corresponding pixel within a corresponding block of the first frame. The motion of the corresponding pixel is determined based on a reference frame of the first frame. The current block is then encoded using the prediction block.

In some implementations, the technique 700 includes encoding one or more syntax elements indicative of at least one of the block-level disparity or the warping parameters to a bitstream to which the current block is encoded. For example, a number of bits may be included in a frame header for the first frame within the bitstream. The number of bits can indicate the block-level disparity, the warping parameters, or both. The number of bits may later be decoded from the frame header, such as by a hardware or software component used to decode the bitstream and output the encoded stereo video sequence including the encoded current block for display. Alternatively, a number of bits may be included in the bitstream for the current block of the first frame to indicate one or both of the block-level disparity or the warping parameters thereof. Those number of bits may later be decoded from the bitstream to decode the encoded current block.

In some implementations, the technique 700 includes partitioning at least some of the first frame based on the rate-distortion values determined for the plane normal candidates. For example, a depth-first partition search can be performed against the current block. The block-level disparity can be obtained at each partition block level, which block-level disparity is used to perform the normal search against the three-dimensional linear plane. The partitioning is then performed based on rate-distortion values determined as a result of the normal search and based on the block-level disparity. A more accurate disparity approximation, and thus larger video blocks (e.g., with larger partitioned sizes within the first frame), is produced by basing the partitioning on the rate-distortion values and the normals (nx, ny, nz). Syntax elements indicative of the partitioning can be encoded to the bitstream to which the current block is encoded.

In some implementations, the warping parameters used to encode the current block at 710 may be parameters of a non-affine motion model. For example, the warping parameters may be parameters of a homographic motion model, a similarity motion model, a translational motion model, or the like. The number of parameters included in the warping parameters may thus differ based on the particular parameterized motion model used to encode the current block.

The technique 700 as shown and described with respect to FIG. 7 reflects a technique for encoding a video block of a stereo video sequence. However, in some implementations, the technique 700 can be performed to encode a video block of a non-stereo video sequence. In an example, the technique 700 can be performed to predict an affine motion of a current block. Affine motion models thus support translation, rotation, scale, changes in aspect ratio, and shearing. For example, a rotation-zoom only affine motion model for modeling zoom and rotational motion may use four parameters to project the pixels of the current block to a warped reference area. As such, those four parameters defining the affine motion model can be used to project pixels of the current block to a warped reference area in the second frame, a reference frame used to encode one or more blocks of the first frame, or the like.

The affine projection between two spaces is defined as $u(x, y)=a*x+b*y+c$ and as $v(x, y)=b*x+a*y+f$, where $(u(x, y), v(x, y))$ is a motion vector MV at a pixel positioned at (x, y) within the current block; and where a, b, c, and f are unknown parameters of the affine motion model. A given pixel of the current block can be represented in a local coordinate system where the origin is the center of the current block (e.g., (0, 0)). A block-level motion estimation can be performed against respective blocks of a video frame to determine block-level motion vectors for those blocks. Those block-level motion vectors can then be used to represent the motion vector MV of the center pixel of the current block.

The above-described four parameter affine projection may be rearranged as $-a*(x-x0)-b*(y-y0)+(u-u0)=0$ and as $b*(x-x0)-a*(y-y0)+(v-v0)=0$, where (u, v) is used to represent a motion vector instead of the function form (u(x, y), v(x, y)) for simple notations. Dividing those rearranged equations by $h=\sqrt{a*a+b*b+1}$ results in the equations $-a/h*(x-x0)-b/h*(y-y0)+1/h*(u-u0)=0$ and $b/h*(x-x0)-a/h*(y-y0)+1/h*(v-v0)=0$. Variables can then be defined and substituted into those rearranged equations. For example, A can represent the value of $-a/h$, B can represent the value of $-b/h$, and C can represent the value of $-1/h$. The rearranged equations may therefore be re-written as $A*(x-x0)+B*(y-y0)+C*(u-u0)=0$ and as $-B*(x-x0)+A*(y-y0)+C*(v-v0)=0$.

The four affine parameters a, b, c, f can therefore be estimated by determining values of A, B, and C. (A, B, C) is a normal vector where $A*A+B*B+C*C=1$. The values of A, B, and C are limited to $-1<A<1$, $-1<B<1$, and $0<C<=1$. Candidate values of A, B, and C can be determined such as by performing the operations described at 704, above. The motion vectors at respective pixels in the current block are then calculated, and one such motion vector is selected, to determine the warping parameters for the current block, for example, as described at 706 and 708, above. Those warping parameters are then used to warp a reference block to the current block (e.g., a reference block within the second frame or a reference frame used to encode one or more blocks of the first frame) to encode the current block.

Referring next to FIG. 8, a flowchart diagram of an example of a technique 800 for decoding an encoded block using a parameterized motion model is shown. The technique 800 may be performed to decode encoded blocks of an encoded stereo video sequence, for example, where a first encoded frame and a second encoded fame of the encoded stereo video sequence represent left and right views of the stereo video sequence. Alternatively, the technique 800 may be performed to decode encoded blocks of an encoded non-stereo video sequence, for example, where the first encoded frame and the second encoded frame are sequential frames of a video sequence.

At 802, a bitstream representative of an encoded stereo video sequence is received. The encoded video sequence includes a first encoded frame and a second encoded frame. For the purpose of describing the technique 800, the second encoded frame may be presumed to have already been decoded such that it serves as the reference frame for decoding one or more encoded blocks of the first encoded frame. The first encoded frame includes the encoded block to be decoded. The bitstream may be received from an encoder (e.g., the encoder 400 shown in FIG. 4), a device implementing an encoder (e.g., the transmitting station 102 shown in FIG. 1), or the like.

At 804, warping parameters are determined from the bitstream. The bitstream includes syntax elements indicative of the encoded video sequence. For example, the syntax elements may represent data indicative of the encoded blocks and encoded frames to be output for display as an output video stream. In another example, the syntax elements may include other data used to encode the encoded blocks and encoded frames and which may also be used to decode those encoded blocks and encoded frames, such as warping parameters. Determining the warping parameters can therefore include decoding one or more syntax elements indicative of the warping parameters from the bitstream.

The warping parameters are determined from the bitstream for predicting motion within the encoded block to be decoded using a selected plane normal candidate. The selected plane normal candidate represents a current pixel of the encoded block. The selected plane normal candidate was selected based on a block-level disparity between the first encoded frame and a second encoded frame of the encoded video sequence, such as during operations for encoding the encoded block. The warping parameters are parameters of an affine plane including the current pixel and a corresponding pixel of the current pixel within an encoded block of the second encoded frame. Other information, for example, the block-level disparity or partition information, may also be determined by decoding syntax elements from the bitstream.

At 806, the encoded block is decoded according to the warping parameters. Decoding the encoded block according to the warping parameters can include generating a prediction block by warping the reference block of the second frame. The encoded block is then decoded using the prediction block.

In some implementations, the warping parameters used to decode the encoded block at 806 may be parameters of a non-affine motion model. For example, the parameterized motion model reflected by the warping parameters may be a homographic motion model, a similarity motion model, a translational motion model, or the like. The number of parameters included in the warping parameters may thus differ based on the particular parameterized motion model used to decode the encoded block.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500.

Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device, and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described embodiments, implementations, and aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for encoding a stereo video sequence, the method comprising:
    performing block-level motion estimation for a current block of a left view frame of the stereo video sequence using a translational motion model to determine a block-level disparity between the left view frame and a right view frame of the stereo video frame sequence, wherein the right view frame corresponds to the left view frame, wherein the block-level disparity represents a horizontal positional difference between the current block and a reference block within the right view frame;
    performing, based on the block-level disparity and based on a location of a sample pixel of the current block, a normal search against at least some pixels of the current block to determine pixel-level disparities;
    determining plane normal candidates representing different normal values for the current block using the pixel-level disparities;
    selecting one of the plane normal candidates as a plane normal using a rate-distortion optimization comparing rate-distortion values of the plane normal candidates;
    generating a warped reference frame by warping the right view frame according to the plane normal and warping parameters determined for the current block, wherein the warping parameters use a non-translational motion model to model motion of the current block;
    generating a prediction block for the current block using the warped reference frame; and
    encoding the current block to an encoded bitstream using the prediction block.

2. The method of claim 1, wherein performing the block-level motion estimation for the current block using the translational motion model to identify the one or more block-level disparities between the left view frame and the right view frame comprises:
    identifying a collocated block within the right view frame based on a location of the current block with the left view frame; and
    performing a block-level one-dimensional disparity search against the collocated block within the right view frame to identify the reference block within the right view frame, wherein video features of the reference block correspond to video features of the current block.

3. The method of claim 2, wherein the block-level one-dimensional disparity search is a modified two-dimensional diamond search.

4. The method of claim 1, wherein performing the normal search against the at least some pixels of the current block to determine the pixel-level disparities comprises:
    modeling the block-level disparity using a function of a three-dimensional linear plane to determine warping parameters for the current block; and
    determining sets of values of a normal vector of a three-dimensional linear plane used to model one-dimensional motion associated with the block-level disparity, wherein at least some of the values of the normal vector represent an X-axis position and a Y-axis position of a pixel within the current block determined based on results of the normal search, wherein each of the sets of values represents a plane normal candidate of the plane normal candidates.

5. The method of claim 4, wherein the values of the normal vector are searched within a predefined discrete set of values.

6. The method of claim 4, wherein modeling the block-level disparity using the function of the three-dimensional linear plane to determine the warping parameters for the current block comprises:
    using an X-axis position and a Y-axis position of a pixel within the current block to determine a first warping parameter and a second warping parameter,
    wherein the function states that a value of a block-level disparity associated with the pixel is equal to a sum of a first value, a second value, and a third value, wherein the first value represents the X-axis position of the pixel within the current block weighted according to the first warping parameter, the second value represents the Y-axis position of the pixel within the current block weighted according to the second warping parameter, and the third value represents the block-level disparity.

7. The method of claim 6, wherein the first warping parameter and the second warping parameter are common for all pixels in the current block.

8. The method of claim 1, wherein selecting one of the plane normal candidates as the plane normal using the rate-distortion optimization comparing the rate-distortion values of the plane normal candidates comprises:
determining, for a plane normal candidate of the plane normal candidates, a rate-distortion value as a sum of a first value and a second value, wherein the first value represents a sum of absolute pixel difference between the current block and the reference block and the second value represents a product of a Lagrange multiplier and a sum of a disparity rate and a normal rate for the plane normal candidate.

9. The method of claim 1, wherein encoding the current block to the encoded bitstream using the prediction block comprises:
encoding, to the encoded bitstream, one or more syntax elements indicative of at least one of the block-level disparity, the plane normal, or the warping parameters.

10. The method of claim 1, further comprising:
decoding the encoded bitstream to an output stereo video stream; and
simultaneously outputting for display, at a virtual reality headset configured for stereo video viewing, the left view frame and the right view frame, wherein the left view frame is output for display to a left eye of a user of the virtual reality headset and the right view frame is output for display to a right eye of the user.

11. A method for encoding a stereo video sequence, the method comprising:
determining a block-level disparity between a left view frame of the stereo video sequence and a corresponding right view frame of the stereo video sequence;
modeling the block-level disparity using a function of a three-dimensional linear plane to determine warping parameters for a current block of the left view frame;
determining pixel-level disparities for pixels of the current block using the warping parameters and using locations of the pixels within the current block;
identifying a plane normal for the current block based on the pixel-level disparities;
generating a warped reference frame by warping the right view frame according to the plane normal and the warping parameters using a non-translational motion model; and
encoding the current block to an encoded bitstream using a prediction block generated for the current block using the warped reference frame.

12. The method of claim 11, wherein determining the block-level disparity between the left view frame and the right view frame comprises:
performing a block-level one-dimensional disparity search against a collocated block of the current block using a translational motion model to determine the block-level disparity, wherein the collocated block is in the right view frame, wherein the block-level disparity represents a horizontal positional difference between the current block and a reference block within the right view frame.

13. The method of claim 11, wherein modeling the block-level disparity using the function of the three-dimensional linear plane to determine the warping parameters for the current block comprises:
using an X-axis position and a Y-axis position of a pixel within the current block to determine a first warping parameter and a second warping parameter,
wherein the function states that a value of a block-level disparity associated with the pixel is equal to a sum of a first value, a second value, and a third value, wherein the first value represents the X-axis position of the pixel within the current block weighted according to the first warping parameter, the second value represents the Y-axis position of the pixel within the current block weighted according to the second warping parameter, and the third value represents the block-level disparity.

14. The method of claim 11, wherein determining the pixel-level disparities for pixels of the current block using the warping parameters and using the locations of the pixels within the current block comprises:
determining sets of values of a normal vector of a three-dimensional linear plane used to model one-dimensional motion associated with the block-level disparity, wherein at least some of the values of the normal vector represent an X-axis position and a Y-axis position of a pixel within the current block determined based on results of the normal search, wherein each of the sets of values represents a plane normal candidate of the plane normal candidates.

15. The method of claim 11, wherein identifying the plane normal for the current block based on the pixel-level disparities comprises:
determining plane normal candidates representing different normal values for the current block using the pixel-level disparities;
determining, for each of the plane normal candidates, a rate-distortion value as a sum of a first value and a second value, wherein the first value represents a sum of absolute pixel difference between the current block and a reference block within the left view frame and the second value represents a product of a Lagrange multiplier and a sum of a disparity rate and a normal rate for the plane normal candidate; and
selecting one of the plane normal candidates as a plane normal using a rate-distortion optimization comparing the rate-distortion values of the plane normal candidates.

16. A method for decoding an encoded bitstream representative of a stereo video sequence, the method comprising:
decoding an encoded block of a left view frame of the stereo video sequence from the encoded bitstream using a prediction block generated based on a warped reference frame, wherein the encoded block is encoded by:
determining a block-level disparity between the left view frame and a corresponding right view frame of the stereo video frame sequence;
modeling the block-level disparity using a function of a three-dimensional linear plane to determine warping parameters for a current block of the left view frame;
determining pixel-level disparities for pixels of the current block using the warping parameters and using locations of the pixels within the current block;
identifying a plane normal for the current block based on the pixel-level disparities;
generating the warped reference frame by warping the right view frame according to the plane normal and the warping parameters; and encoding, as the encoded block, the current block to the encoded bitstream using a prediction block generated for the current block using the warped reference frame.

17. The method of claim 16, wherein determining the block-level disparity between the left view frame and the right view frame comprises:
performing a block-level one-dimensional disparity search against a collocated block of the current block using a translational motion model to determine the block-level disparity, wherein the collocated block is in the right view frame, wherein the block-level disparity represents a horizontal positional difference between the current block and a reference block within the right view frame.

18. The method of claim 16, wherein modeling the block-level disparity using the function of the three-dimensional linear plane to determine the warping parameters for the current block comprises:
using an X-axis position and a Y-axis position of a pixel within the current block to determine a first warping parameter and a second warping parameter,
wherein the function states that a value of a block-level disparity associated with the pixel is equal to a sum of a first value, a second value, and a third value, wherein the first value represents the X-axis position of the pixel within the current block weighted according to the first warping parameter, the second value represents the Y-axis position of the pixel within the current block weighted according to the second warping parameter, and the third value represents the block-level disparity.

19. The method of claim 16, wherein determining the pixel-level disparities for pixels of the current block using the warping parameters and using the locations of the pixels within the current block comprises:
determining sets of values of a normal vector of a three-dimensional linear plane used to model one-dimensional motion associated with the block-level disparity, wherein at least some of the values of the normal vector represent an X-axis position and a Y-axis position of a pixel within the current block determined based on results of the normal search, wherein each of the sets of values represents a plane normal candidate of the plane normal candidates.

20. The method of claim 16, wherein identifying the plane normal for the current block based on the pixel-level disparities comprises:
determining plane normal candidates representing different normal values for the current block using the pixel-level disparities;
determining, for each of the plane normal candidates, a rate-distortion value as a sum of a first value and a second value, wherein the first value represents a sum of absolute pixel difference between the current block and a reference block within the left view frame and the second value represents a product of a Lagrange multiplier and a sum of a disparity rate and a normal rate for the plane normal candidate; and
selecting one of the plane normal candidates as a plane normal using a rate-distortion optimization comparing the rate-distortion values of the plane normal candidates.

* * * * *